United States Patent
Delbaere et al.

(10) Patent No.: US 12,222,745 B2
(45) Date of Patent: Feb. 11, 2025

(54) CONTROL DEVICE COMPRISING A MECHANICALLY GUIDED MEMBER FOR ENABLING A RELATIVE MOVEMENT

(71) Applicant: Moving Magnet Technologies, Besançon (FR)

(72) Inventors: Michaël Delbaere, Besançon (FR); Jean-Daniel Alzingre, Besançon (FR)

(73) Assignee: MOVING MAGNET TECHNOLOGIES, Besançon (FR)

( * ) Notice: Subject to any disclaimer, the term of this patent is extended or adjusted under 35 U.S.C. 154(b) by 0 days.

(21) Appl. No.: 18/565,705

(22) PCT Filed: Jun. 2, 2022

(86) PCT No.: PCT/FR2022/051052
§ 371 (c)(1),
(2) Date: Nov. 30, 2023

(87) PCT Pub. No.: WO2022/254158
PCT Pub. Date: Dec. 8, 2022

(65) Prior Publication Data
US 2024/0143017 A1    May 2, 2024

(30) Foreign Application Priority Data
Jun. 2, 2021   (FR) ...................................... 2105801

(51) Int. Cl.
*G05G 5/03* (2008.04)
*F16D 63/00* (2006.01)
(Continued)

(52) U.S. Cl.
CPC ............. *G05G 5/03* (2013.01); *F16D 63/002* (2013.01); *G05G 1/08* (2013.01); *G05G 5/04* (2013.01);
(Continued)

(58) Field of Classification Search
CPC ...... G06F 3/016; G06F 3/0362; G06F 3/0393; G05G 5/03; G05G 1/08; G05G 1/10;
(Continued)

(56) References Cited

U.S. PATENT DOCUMENTS

| | | | |
|---|---|---|---|
| 4,408,859 | A | 10/1983 | Fukahori et al. |
| 2017/0045958 | A1 | 2/2017 | Battlogg |

(Continued)

FOREIGN PATENT DOCUMENTS

| | | |
|---|---|---|
| EP | 0018292 A1 | 10/1980 |
| EP | 1891494 | 11/2008 |

(Continued)

OTHER PUBLICATIONS

French Search Report for Application No. 2105801 dated Mar. 4, 2022, 2 pages.

(Continued)

*Primary Examiner* — Koosha Sharifi-Tafreshi
(74) *Attorney, Agent, or Firm* — TraskBritt

(57) ABSTRACT

A control device comprising at least one permanent magnet, and a mechanically guided member for enabling a relative movement between a. a first ferromagnetic structure, b. a second ferromagnetic structure comprising at least one electric coil, the electric coil modifying the magnetization state of the second ferromagnetic structure in accordance with the direction and the amplitude of the electric current flowing in the coil, the device furthermore comprising a position detection means for detecting the relative position of the first and second ferromagnetic structures, and a circuit for driving the supply current of the coil, which varies as a function of the signal delivered by the position detection means.

25 Claims, 13 Drawing Sheets

(51) Int. Cl.
    *G05G 1/08* (2006.01)
    *G05G 5/04* (2006.01)
    *G05G 5/06* (2006.01)
    *G06F 3/01* (2006.01)
    *G06F 3/0362* (2013.01)
    *H01F 7/02* (2006.01)
    *G06F 3/039* (2013.01)

(52) U.S. Cl.
    CPC ............... *G05G 5/06* (2013.01); *G06F 3/016* (2013.01); *G06F 3/0362* (2013.01); *H01F 7/02* (2013.01); *G05G 2505/00* (2013.01); *G06F 3/0393* (2019.05)

(58) Field of Classification Search
    CPC ........ G05G 5/04; G05G 5/06; G05G 2505/00; B60K 2360/126; H01H 2003/008; F16D 63/002; H01F 7/02; H01F 7/0226
    USPC ............................................ 345/184; 74/553
    See application file for complete search history.

(56) References Cited

U.S. PATENT DOCUMENTS

2020/0004346 A1\* 1/2020 Vlasov .................. H01F 7/0226
2020/0005977 A1  1/2020 Keltz et al.

FOREIGN PATENT DOCUMENTS

EP      1999534      2/2011
WO    2020/109744    6/2020

OTHER PUBLICATIONS

French Written Opinion for Application No. 2105801 dated Mar. 4, 2022, 6 pages.
International Search Report for Application No. PCT/FR2022/051052 dated Oct. 21, 2022, 3 pages.
International Written Opinion for Application No. PCT/FR2022/051052 dated Oct. 21, 2022, 7 pages.

\* cited by examiner

A-A

CONTROL DEVICE COMPRISING A MECHANICALLY GUIDED MEMBER FOR ENABLING A RELATIVE MOVEMENT

CROSS-REFERENCE TO RELATED APPLICATIONS

This application is a national phase entry under 35 U.S.C. § 371 of International Patent Application PCT/FR2022/051052, filed Jun. 2, 2022, designating the United States of America and published as International Patent Publication WO 2022/254158 A1 on Dec. 8, 2022, which claims the benefit under Article 8 of the Patent Cooperation Treaty of French Patent Application Serial No. FR2105801, filed Jun. 2, 2021.

TECHNICAL FIELD

The present disclosure relates to the field of configurable control devices comprising a control button or accessory movable according to a rotary or linear displacement, for example, a control button associated with an electromagnetic sensor for providing an analog signal that represents the position and/or displacement of the control button. The fact that it is configurable makes it possible to modify the states of the button, for example, with variable indexing or variable stops.

The present disclosure relates, in particular, to a configurable haptic control device constituting a man-machine interface whose tactile sensation can be modified by manual selection from among two or more activatable modes or by a contextual automatic selection. The modes of sensation comprise a sensation of notching, regular or irregular indexing or a stop sensation.

The desired purpose is that the user feels a tactile effect, for example, by passing over a hard point, arriving at a stop, or regular or irregular indexing, when operating this control member, so as to have the physical sensation that the maneuver has actually been carried out or to haptically perceive the number of increments resulting from the user's manipulation by creating haptic feedback by touch. It is also important to be able to dynamically modify the sensation felt depending on, for example, the type of control carried out with the same button or when the action has been carried out by the system, thus enriching the information given and the user experience. This modification of the sensation may be controlled manually, for example, by a selection button, or else in a contextually and automatically controlled manner.

This control device is used by way of example in the automotive industry. It may be used in a vehicle, for example, to control the operation and adjustment of lights, mirrors, windshield wipers, air conditioning, infotainment, radio, gearbox control or the like.

It is also applicable in numerous industries, in particular, controlling domestic or industrial equipment, for example, in the form of a control button for household or audiovisual equipment, the indexing pitch and the stiffness of which vary depending on the context to offer a softness sensation for the sweep of a wide adjustment range and then an indexing marked for a fine adjustment, or the reverse for a sweep of a wide range by successive jumps, then a soft adjustment giving a sensation of continuity or else of end-of-travel stop sensation.

This device can also be associated with an electric motor in order to achieve an adjustable force such as a controllable residual torque (without current in the motor), or a force for returning to a predefined stable position, a brake or a controllable stop.

BACKGROUND

Patent application WO2020109744 is known in the state of the art, which describes a device of adjustable resistance comprising a mechanically guided member for enabling a displacement along a predetermined trajectory and means for magnetically indexing the displacement by the magnetic interaction between a first ferromagnetic structure and a second ferromagnetic structure rigidly connected to a magnet, wherein the magnet is surrounded at least partially by an electric coil that modifies the magnetization of the permanent magnet according to the direction and amplitude of the electric current flowing in the coil.

Patent application US2020005977 describes a mouse comprising a rotary input control having a wheel and a set of electro-permanent magnets (EPM), the EPM assembly comprising a permanent magnet and a magnetizing assembly configured to control a polarization of the permanent magnet to change the set of electro-permanent magnets from a first state wherein the EPM assembly applies a first resistance profile to the wheel and a second state wherein the EPM assembly applies a second resistance profile to the wheel. The EPM assembly comprises magnetically conductive elements positioned at opposite ends of the electro-permanent magnet, each magnetically conductive element comprising a respective plurality of teeth protruding radially toward the wheel.

Patent EP1999534 describes a blocking device to at least partially block a relative movement between a stationary part and a movable part of a device, the device comprising at least one permanent magnet, an electromagnet on a ferromagnetic core, a stop profile in the movable part and a blocking element able to be engaged with the stop profile, the permanent magnet being movably arranged in the device between at least two extreme positions, characterized by the fact that the ferromagnetic core is essentially U-shaped and that the permanent magnet is located, in each extreme position, at the end of a branch of the ferromagnetic core, and that the electromagnet arranged on the ferromagnetic core and the movable permanent magnet are made in such a way that the blocking element follows the position of the permanent magnet.

Patent EP1891494 describes a simple and reliable device that takes a ball from a rest position to a blocking position by means of an electromagnet. In the blocking position, the ball mechanically blocks the relative movement between two elements.

Patent EP0018292 describes an electrohydraulic rotary brake comprising an inner core, at least one excitation winding, a cylindrical non-magnetic sheath, an annular part outside the core and the sheath and comprising a cylindrical bore off-center with respect to the cylindrical peripheral surface of the sheath, recesses provided with magnetizable sliding vanes and a brake fluid.

U.S. Pat. No. 4,408,859 describes a speed regulator for a camera having a first speed control means arranged to synchronously drive with increased speed a drive element that drives a high-speed actuation element to a predetermined position and a second speed control means arranged to brake the driving force of the drive element.

The solutions of the prior art are not completely satisfactory because varying the nature of the haptic interaction, for example, by reducing the stiffness when the control button is close to a target position and on the contrary increasing it when the target position is far away requires movements with greater jumps, is limited to two modes and does not make it possible to modulate the sensations more concisely, for example, by modifying the indexing pitch or by offering different levels of stiffnesses or even a blocking.

Furthermore, although patent application US20170045958 indeed proposes a dynamic modulation of the effect felt on a turn controlled by a magnetic field and a magnetorheological fluid, this solution, in particular, has the disadvantage of using magnetorheological fluid that requires disadvantageous design constraints, in particular, as relates to sealing.

Most known solutions that generate variable friction must be continuously powered to simulate a notch, which leads to continuous electrical consumption. This is detrimental to applications where energy saving constitutes a sensitive issue, for example, battery-powered equipment or electric vehicles. These known solutions also create an unusual sensation, without a spring effect (the force provided by the user is always positive) making the tactile sensation not very intuitive.

Finally, the solutions of the prior art make it possible to modulate the amplitude of the torque that will change between a zero value and a maximum value of resistance to movement but does not enable the sign of the torque to be varied. It is therefore not possible to produce a sensation corresponding to alternating positive and negative torque that traditionally has, for example, passive interfaces.

BRIEF SUMMARY

In order to address these drawbacks, a control device according to the present disclosure comprises a mechanically guided member to allow relative movement between:
  a first ferromagnetic structure;
  a second ferromagnetic structure comprising at least one electric coil modifying the state of magnetization of the second ferromagnetic structure along the direction and amplitude of the electric current flowing in the coil;
  and further, a circuit for controlling the supply current of the coil as a function of an input signal representative of the relative position of the ferromagnetic structures.

Advantageously, the supply current of the coil is controlled as a function of contextual input signals representative of the overall state of the controlled equipment, and not just of the state of a selector.

The force with such a device can be controlled dynamically as a function of the position of the control button, which makes it possible to modulate the positions referenced in real time, during the actuation of the button, contrary to the solutions of the prior art where these reference positions were fixed for each operating mode.

The present disclosure thus makes it possible to vary the pitch of indexing over the travel of the control button, for example, for a sensation of fine notching in a precise adjustment area, and a courser notching with a greater pitch in adjustment areas of lesser interest. It also makes it possible to dynamically reveal or remove a stop, as a function of external data and the position of the button.

For buttons delivering a notched sensation, the device comprises means for magnetic indexing of the movement by the magnetic interaction between the ferromagnetic structures, the circuit for controlling the supply current of the coil controlling the modification of the magnetization of the permanent magnet according to a mode plurality, some of the modes clearing a part of the indexed positions.

Advantageously, the first and second ferromagnetic structures, respectively, have a plurality of radial teeth cooperating to produce the magnetic indexing means.

According to one alternative, the control device further comprises a means for selecting a variable force mode from a plurality of predetermined variable force modes, delivering a signal used by the control circuit to modify the mode of supply of the coil.

According to other features, the control device further comprises:
  an interface with controlled equipment delivering a signal used by the control circuit to modify the supply mode of the coil;
  a position sensor able to measure the position of the first ferromagnetic structure, in order to provide to the control circuit of the supply current of the coil, the input signal representative of the relative position of the first and second ferromagnetic structures;
  an electronic memory for recording at least two control laws, the electronic circuit comprising an input for selecting one of the control laws;
  an active stop consisting of a first structure in relative movement with respect to a second structure and at least one braking element to impede the relative movement between the first and second structures by the magnetic interaction between the braking element, and the second structure comprising a ferromagnetic body surrounded at least partially with an electric coil, the electrical supply of the coil modifying the magnetization of the ferromagnetic body, the state of magnetization of the ferromagnetic body modulating the braking force between the first and second structures; and
  means for magnetic indexing of the movement between the first and second ferromagnetic structures, the indexing means being directly integrated into the first and second structures, or being produced using two ferromagnetic structures, which are supplemental according to the teaching of the claim, one of the supplemental ferromagnetic structures being integral with the first or second ferromagnetic structure, the other supplemental ferromagnetic structure being integral with the other of the first and second ferromagnetic structures.

Advantageously, the device according to the present disclosure has one or several of the following technical features:
  the control circuit controls the supply current of the coil as a function of a signal representative of the relative position of the first and second ferromagnetic structures,
  the control circuit controls the supply current of the coil as a function of a signal representative of the relative speed of movement of the first and second ferromagnetic structures,
  the permanent magnet of the second ferromagnetic structure is made of a hard ferromagnetic material having a coercive field less than or equal to 100 kA/m, and
  the second ferromagnetic structure is integral with a second permanent magnet made of a hard ferromagnetic material having a coercive field greater than 100 kA/m.

According to alternatives of the present disclosure:
  the second ferromagnetic structure comprises at least two permanent magnets, each surrounded at least partially by an electric coil modifying the magnetization in the direction and amplitude of the electric current flowing in the coil, and in that the electronic control circuit determines the supply current of each of the coils as a function of the relative position of the ferromagnetic structures and of the state of a control for selecting an operating mode from a plurality of operating modes, the first structure and second structure have teeth and the second ferromagnetic structure consists of two semi-tubular toothed parts connected on the one hand by the second magnet and on the other hand by the first magnet, the directions of the magnetizations of the two magnets are identical, the state of magnetization of the second ferromagnetic structure is modified in a relative position of the first and second structures located in an interval of more or less 25% of a period of the indexing of the indexing means, the interval being centered on a stable equilibrium position of the indexing means, the state of magnetization of the second ferromagnetic structure is modified in a relative position of the first and second structures located in an interval of more or less 10% of a period of the indexing of the indexing means, the interval being centered on a stable equilibrium position of the indexing means, the braking element is able to modulate the braking force between the first and second structures, in a single direction of the relative movement, a second braking element is able to modulate the braking force between the first and second structures, in the opposite direction, the braking element is able to modulate the braking force between the first and second structures, in both directions of the relative movement, the braking element is configured to impede the relative movement between the first and second structures by the magnetic interaction between:
the braking element,
the first structure, and
the second structure, the ferromagnetic body consists of a soft ferromagnetic material whose magnetization is zero in the absence of current for supplying the coil, the ferromagnetic body has housings, of partially cylindrical shape and each capable of receiving a cylindrical braking element, the braking elements are articulated relative to an off-center axis and, by the movement of one of the braking elements in one direction, the braking element comes into contact with the first structure, or in the opposite direction, the braking element retracts within its housing, when the braking element is in contact with the first structure, the movement of the first structure in one direction causes its blocking by abutment of the braking element, due to its eccentric rotation, the ferromagnetic body has a permanent magnet at least partially surrounded by the coil, the amplitude of magnetization of the permanent magnet being modulated by the coil, and the coil is controlled by a computer associated with a memory periodically recording the states of the control device in order to determine the most frequent states.

The present disclosure also relates to a man-machine interface comprising a display screen wherein it further comprises at least one control device having the features according to at least one of the preceding claims, arranged on the viewing surface of the display screen.

Advantageously, the control device has a central recess for displaying, in the screen zone arranged behind the central recess, information determined as a function of the state of the control device.

The present disclosure further relates to an actuator comprising a module for driving an output member, wherein it further comprises a control device having the features according to at least one of the preceding claims, coupled to the output member.

BRIEF DESCRIPTION OF THE DRAWINGS

The present disclosure will be better understood on reading the following description, which concerns non-limiting embodiments illustrated by the appended figures, in which.

DETAILED DESCRIPTION

Force Modulation Device

The present disclosure relates to an adjustable force device, active notching and/or active stop, making it possible to modify the force dynamically by a computer control varying as a function of the position of the control button. This force can be likened to that of an indexed control, with variable indexes, regular or not, and/or controlled stops. The stops can be quite clear, that is to say causing complete blocking of the system in a given direction, or indicative, that is, by being materialized by greater friction starting from a given position. The use of such a device is particularly advantageous for providing haptic feedback to a user, but is also of interest for generating a modulation of force on a member to be driven.

Depending on the application, the force to be adjusted can vary, for some only a notching effect is desired, for other purposes only a stop effect is necessary and for others both are to be implemented but without necessarily being coupled. Therefore, various solutions are shown through exemplary embodiments.

Figure 1:
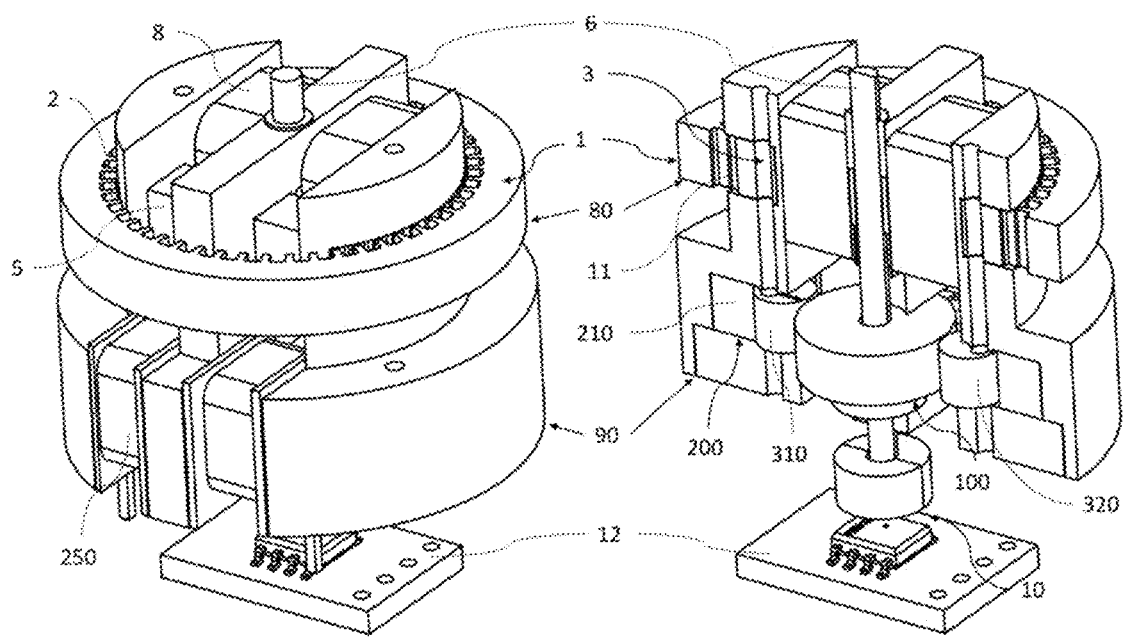
FIG. 1 shows perspective and cross-sectional views of an example of an active notching device provided with an active stop.

FIG. 1 shows a first embodiment incorporating an active notching device (80) and an active stop device (90) in a haptic system with rotary actuation. In the exemplary embodiment of FIG. 1, the devices each have a cylindrical shape and are axially superimposed. This first embodiment must be interpreted as integrating two devices according to the most general claim, one being dedicated to notching and the other to adjustable stop. This embodiment is preferred when both functions, notching and stop, are desired with perfect decorrelation, FIG. 17 for its part showing the interweaving of both functions in a single device, but with an interdependency.

The notching device (80), which will be more particularly described through other examples, is composed of a first structure (1) comprising a soft ferromagnetic material, and a second structure (3) associating a circuit made of a soft ferromagnetic material with a permanent magnet (7) and a semi-persistent magnet at least partially surrounded by an electric coil (8), the structures being able to move relatively in rotation. The notching effect is obtained due to the cooperation of teeth (2, 11) structuring opposite surfaces of the ferromagnetic material parts of the first and second structure (1, 3).

The stop device (90), which will also be described more completely through different examples, is composed of a first structure (100) and a second structure (200) that can move relatively in rotation, and braking elements (310, 320) for impeding the relative movement of the structures. The first structure (100) comprises a soft ferromagnetic body (210) the magnetization state of which can be modified as a function of the supply current of a coil (250), the magnetization state of the ferromagnetic body (210) acting on the position of the braking elements (310, 320) to modulate the resistance to the relative movement of the first structure (100) and second structure (200).

In this exemplary embodiment, the haptic system is in the form of a button, the external flange actuated by the user not being shown. This exterior flange is rigidly connected to the first structure (1) of the notching device (80), to the first structure (100) of the braking device (90) and to an axis (6), the whole forming a first integral assembly, the axis (6) serving both to support the structure (100) and to guide the first integral assembly rotationally relative to a second integral assembly. This second integral assembly, intended to remain stationary during the use of the system, comprises the second structure (3) of the notching device (80) as well as the second structure (200) and means for guiding the braking elements (310, 320) of the braking device (90), as well as an electronic circuit (12) comprising the means for controlling the coils (8, 250). The relative movement of the two integral assemblies is measured by virtue of a magnetic position sensor (10) in this embodiment, produced by the cooperation of a magnet, integral with the axis (6), with a magneto-sensitive probe, integrated into the electronic circuit (12).

This first example of integration in the form of a haptic button is not limiting of the present disclosure, the notching devices (80) and braking devices (90) being able to be produced in very diverse ways and used jointly or independently to modulate forces according to different types of degrees of freedom, or even several degrees of freedom.

This type of active device, and, in particular, in the form of a stop only, can also be of interest in joint use with a motor, for which the stop makes it possible to brake or block the movement of the motor. The indexing form may for its part be integrated into a motor in order to locally modulate the "cogging torque" of the motor to create irreversible positions of a geared motor.

Functional Architecture

Figure 2:
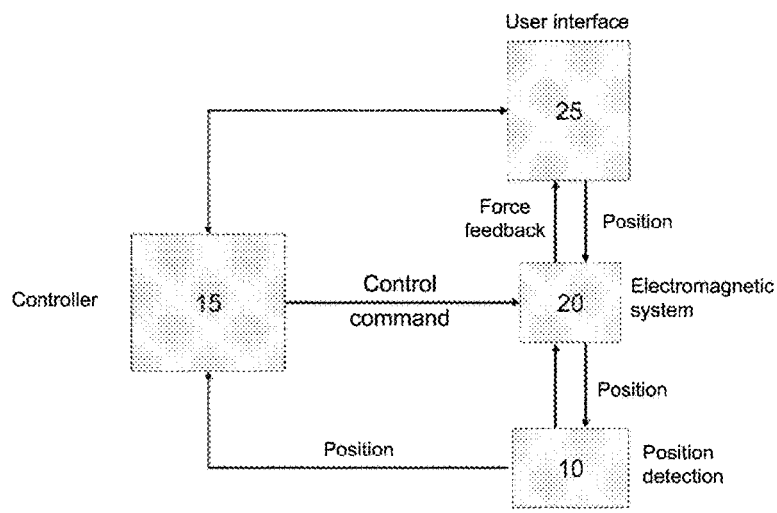
FIG. 2 shows a functional diagram.

As shown in FIG. 2, the device is distinguished from the one described in patent application WO2020109744A2 by the fact that the magnetic system (20) comprises a position sensor (10) (for example, of the optical or electromagnetic or even inductive type) providing an electrical signal representative of the relative position of the structures (1, 3) and a control circuit (15), for example, a microcontroller or an FPGA circuit, as well as a user interface (25) making it possible to act on the relative position of the structures (1, 3) and optionally comprising a selector making it possible to choose a haptic mode from a plurality of recorded modes, resulting in different changes in the torque profile and of different indexed pitches or gaps.

The control circuit determines the direction and amplitude of the supply current of the coil (or of the coils when the electromagnetic system (20) comprises several) as a function on the one hand of the relative position of the structures (1, 3), comprising a ferromagnetic material, and on the other hand as a function of the control law recorded in a memory; and optionally according to the state of a manual selector, controlled by the user, or contextual, controlled by a complementary electronic circuit whose state is controlled by the device.

The energy required to magnetize the coil, even if it remains low overall due to its pulse character, imposes a local energy reserve since it is difficult to access directly by the power supply network, which also requires maintaining this reserve at any moment available to respond to any magnetization event. It is customary for this energy reserve to be in the form of a voltage greater than the one provided by the system to the device.

Depending on the direction of supply of the coil, a magnetization or a demagnetization of the second ferromagnetic structure (3) is caused, as a function of the spatial position of the button and some notches are selectively "turned off" to then make it possible to sculpt (amplitude and frequency) the torque with a very large field of possibilities.

The possibility of freely modifying the indexing makes it possible, for example, to use the same control button for different interaction modes.

Thus, an infotainment button can manage an alphabetical menu wherein thirty characters and therefore thirty notches would be desirable, a digital menu for the digits then having about ten notches, a free-wheel mode or with a indexing amplitude increasing continuously in order to manage the sound level of the audio system, and in a context-wise manner modifying the number of notches, for example, after selecting the parameters of a first function by an alphabetical mode with 36 notches, choosing a second digital parameter by a digital mode with 10 notches, then a third parameter by a continuous mode without notches and finally a position adjustable stop to indicate haptically the arrival at the end of a selection list.

It is also possible to vary the distance between two steps in the travel of the button, for example, with a coarse adjustment, with separated steps in the rarely used ranges of values, and closer steps in the most relevant range to allow fine adjustment in this zone and to generate a stop at a desired position. The limits of the ranges can be determined by supervised learning from the prior settings, in order to propose, for future settings, a narrowed adjustment range around the value most often selected during past uses.

Figure 3:
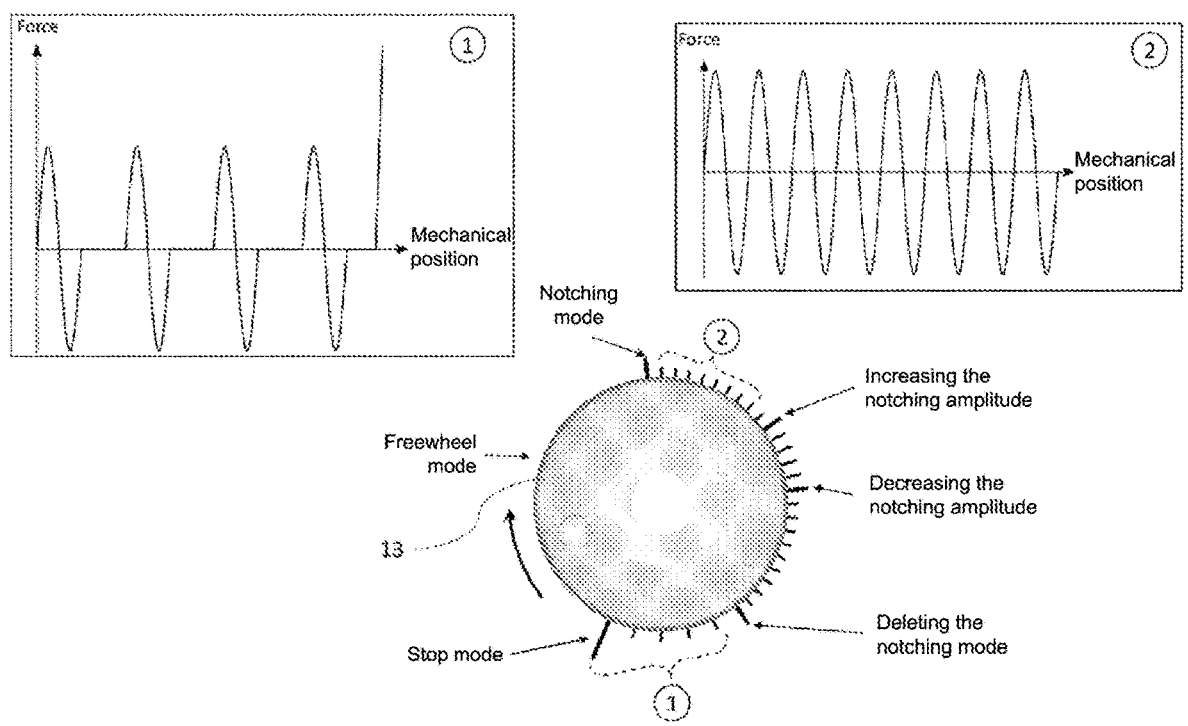
FIG. 3 shows a schematic view of an example of a modulation sequence of the torques felt as a function of the angular position.

FIG. 3 shows an example of a sequence that can be programmed. More particularly, during the rotation of the infotainment button (13), it is possible to calibrate a first angular sector in free rotation, then the activation of the notching mode at a given position, the force profile shown in the box 2 is then obtained. The amplitude of the indexing is then increased over a few steps before being reduced to its initial level. After several steps, one mode or one notch out of two is deactivated before arriving at the activation position of the stop, as shown in the box 1.

It should be noted that FIG. 3 presented only for illustrative purposes in no way limits the present disclosure to the described sequence, and does not limit the present disclosure to the presented embodiments.

Electromechanical Architecture of the Indexing Device

The electromechanical architecture is, in particular, in accordance with one of the examples described in patent application WO2020109744A2, the disclosure of which is incorporated in this patent by citation.

Figure 4A:
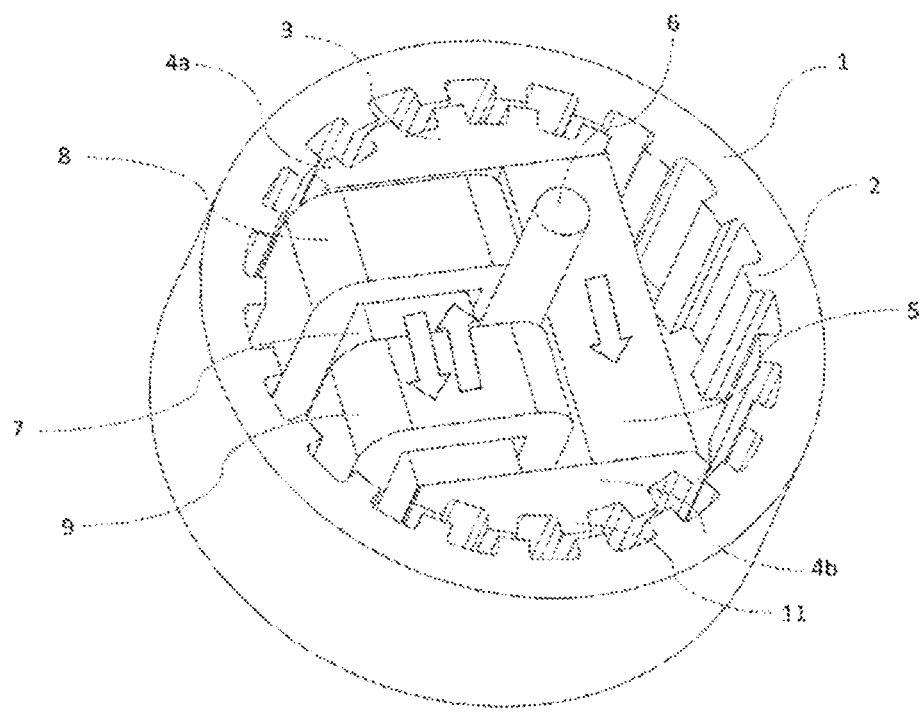
FIG. 4A is a perspective view of a first example of the electromagnetic structure of the active notching device.
Figure 4B:
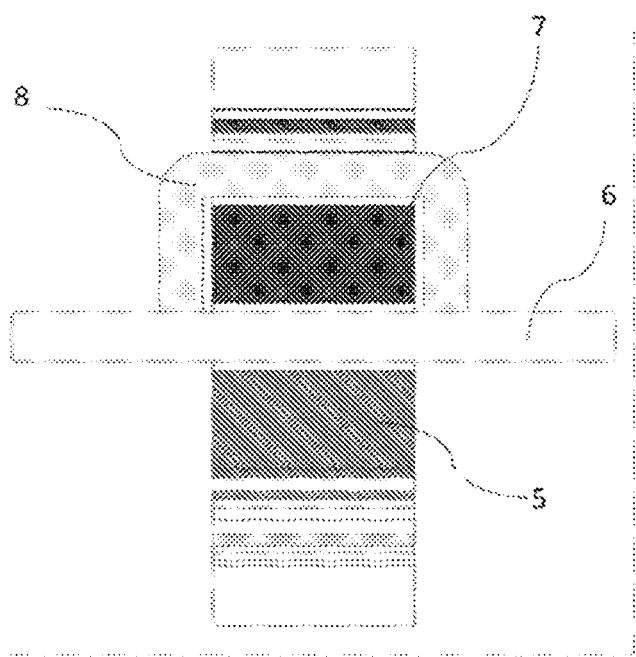
FIG. 4B shows a sectional view of the example of FIG. 4A.
Figure 4C:
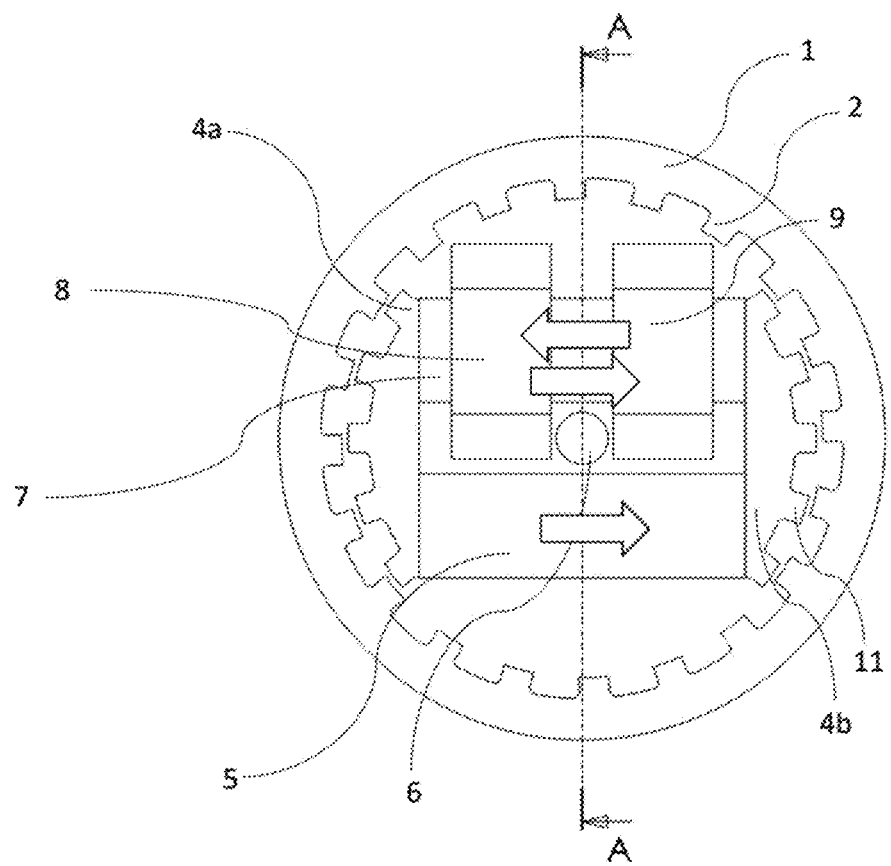
FIG. 4C shows a top view of the example of FIG. 4A.

FIG. 4A is a schematic perspective view of a first embodiment of an electromagnetic structure of the indexing device, and FIGS. 4B and 4C show a sectional view and a top view, respectively, of such a device. In FIGS. 4B and 4C, the thick arrows show the direction of magnetization of the elements.

This example of an indexing device consists of a first structure (1) formed by a toothed cylinder that is made of a ferromagnetic material and, in the example shown, has 20 teeth (2) extending radially, the number of teeth not being limiting. This first structure (1) is in rotation about the axis (6) and is coupled to a manually actuated control button (not visible here).

A second toothed ferromagnetic structure (3) is arranged coaxially inside this first structure (1), and is stationary relative to the movement of the first structure (1). This second ferromagnetic structure (3) consists of two stationary semi-tubular parts (4a, 4b) having teeth (11) that extend radially toward the teeth (2) of the first structure and with the same angular deviation as that of the teeth (2) of the first structure (1). Such an identical angular deviation for the teeth (2) and (11) makes it possible to maximize the force between the first structure (1) and the second structure (3) and therefore to maximize the haptic sensation given to the user. However, the adjustment of this haptic sensation will advantageously be made possible by the number of teeth on the two structures (1, 3) and possibly by a difference in the angular deviation between the teeth (2, 11) or even by the different widths of the teeth (2, 11) between the two structures (1, 3).

The two semi-tubular parts (4a, 4b) are connected on the one hand by a first permanent magnet (5), preferentially of high energy and having a high coercive field, typically of 600 kA/m, and in any case greater than 100 kA/m. The direction of magnetization is along the largest dimension of the magnet, in this case in a direction orthogonal to the axis of rotation (6). The permanent magnet (5) has a function of generating a constant magnetic field, and must not become demagnetized during use of the device.

These two semi-tubular parts (4a, 4b) are also connected on the other hand by a second magnet (7) having a low coercive field, that is to say a magnet of the semi-persistent type or of the AlNiCo type with a persistence typically of 1.2 Tesla and a typical coercive field of 50 kA/m, and in any case of less than 100 kA/m. The direction of magnetization is along the largest dimension of the magnet and in such a way that the magnetic fluxes of the two magnets (5) and (7) are additive or subtractive, depending on the magnetization imparted to the second, low-coercive-field magnet (7), with the magnetic fluxes flowing in the semi-tubular parts (4a, 4b). The low coercive field of the magnet (7) is necessary in order to allow it to be magnetized or demagnetized easily by means of a coil located around it, and this takes place with limited energy, which makes its use in an integrated device possible without the use of powerful and expensive electronics.

This second magnet (7) is arranged in parallel with the first magnet (5) and is surrounded by two electric coils (8, 9). It is possible to install only one coil in an alternative embodiment, the two coils (8 and 9) being, for this example, arranged on either side of the guide axis (6) for the sake of balance and space optimization.

By way of example, each coil consists of 56 turns (28 turns/pocket), in series with a 0.28 mm copper wire, the coil having a terminal resistance of 0.264Ω.

To modulate the direction and/or amplitude of the polarity of the magnetization of the low-coercive-field magnet (7), a current is applied to the coil(s) (8, 9) in the form of a direct current or an electrical pulse, for example, given by discharging a capacitor. By way of example, a current of 13 amperes that generates a magnetomotive force of approximately 730 At makes it possible to modify the magnetization.

The operation of this first embodiment is as follows: when a direct current or a current pulse in a positive direction (arbitrary reference) flows through the coils (8, 9), creating an additive magnetic field between the two coils, the low-coercive-field magnet (7) is magnetized in a direction such that the magnetic fluxes of the two magnets are additive and flow mainly in a loop through the two magnets (5, 7) and the semi-tubular parts (4a, 4b). As a result, there is little or no magnetic flux through the first structure (1) and there is little or no coupling between the two structures (1, 3), and so the user activating the structure does not feel any notching. In this specific example, the magnetizations of the two magnets (5, 7) are parallel and perpendicular to the median plane between the two semi-tubular parts (3, 4), although this configuration is not exclusive.

When a current pulse in a negative direction (arbitrary reference) flows through the coils (8, 9), creating a magnetic field that is again additive between the two coils, the low-coercive-field magnet (7) is magnetized in a direction such that the magnetic fluxes of the two magnets are subtractive and flow mainly in a loop through the two magnets (5, 7) and the two toothed structures (1, 3). This results in marked coupling or notching and a significant indexing sensation is perceived by the user of the device, who thus feels a notching.

The coils (8, 9) are powered by a current driven by a control circuit receiving as input the angular position of the external yoke (1) relative to the yokes (4a, 4b). The intensity of the current in the coils (8, 9) advantageously makes it possible to adjust the haptic sensation by directly influencing the intensity of the magnetization of the low-coercive-field magnet (7) and therefore the coupling flux between the stationary and movable structures.

Examples of Torque Profiles Generated by the Notching Device

Figure 5:
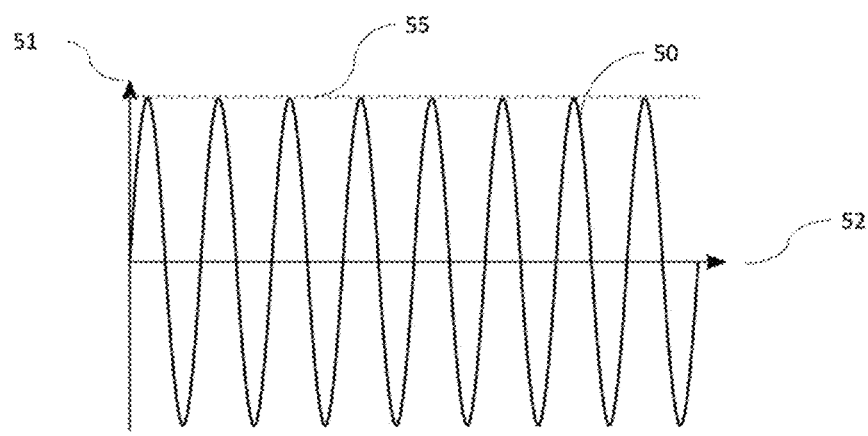
FIG. 5 shows a torque measurement felt when the low-coercive-field magnet has been magnetized to saturation so as to provide a notching.

FIGS. 5 to 9 show different examples of torque profiles according to the present disclosure. FIG. 5 shows the variations of the amplitude (51) obtained as a function of the relative position (52) of the two toothed structures (1, 3) and when the low-coercive-field magnet (7) is saturation magnetized to provide a maximum amplitude notch (55). The usual torque variations profile (50) is obtained for this type of structure and having motor torque alternations when the amplitude is positive, or brake when the amplitude is negative.

Figure 6:
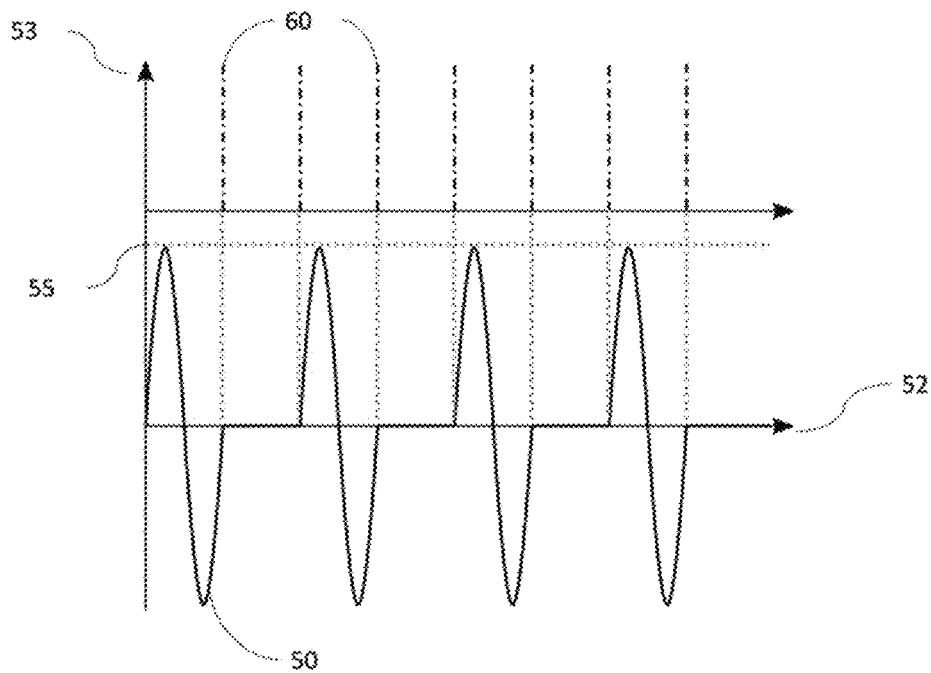
FIG. 6 shows a torque measurement felt during the alternating activation of a step on two of two magnetization states, zero magnetization or at a given level, of the permanent magnet as a function of the position of the actuated button.
Figure 7:
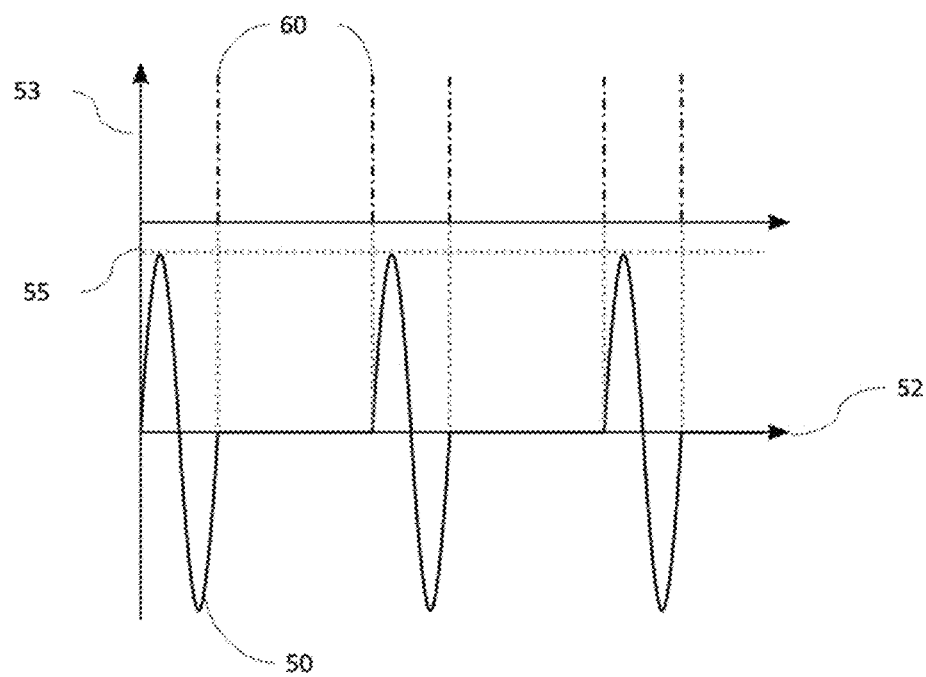
FIG. 7 shows a torque measurement felt during the alternating activation of a step on three of two magnetization states, zero magnetization or at a given level, of the permanent magnet as a function of the position of the actuated button.

FIGS. 6 and 7 show the torque profile resulting from the activation and deactivation of the notching, by the circuit for controlling the supply current of the coil, at different angular positions (60) so as to respectively eliminate one felt notch out of two or two felt notches out of three, relative to the "passive" reference notching shown in FIG. 5. The activation and deactivation angular positions (60) are shown at the upper part of FIGS. 6 and 7, the scale (53) being a representation of a triggering of the change of state without being representative of the value of the current flowing through the coils. The activation and deactivation angular positions (60) correspond here to stable or unstable equilibrium positions of the magnetic interaction of the two toothed structures. The choice of this position makes it possible to locally modulate the torque transitions and to refine the sensation of the user, thus generating the transitions at the points of equilibrium, that is to say, where the forces are the lowest, makes it possible to make this change of state transparent for the user. A stable equilibrium position corresponds to a zero torque position having a negative derivative, whereas an unstable equilibrium position has a positive derivative of its torque.

The relationship between the position returned by the sensor and the position of the equilibrium points of each notch can be determined by the control circuit on powering up, the only necessary and stored information is the number of notches that the device has; thus, on each powering up, the device can deduce the angular location of all of the notches from the moment when it is situated at a stable position. It is also possible to use an absolute sensor.

Figure 8:
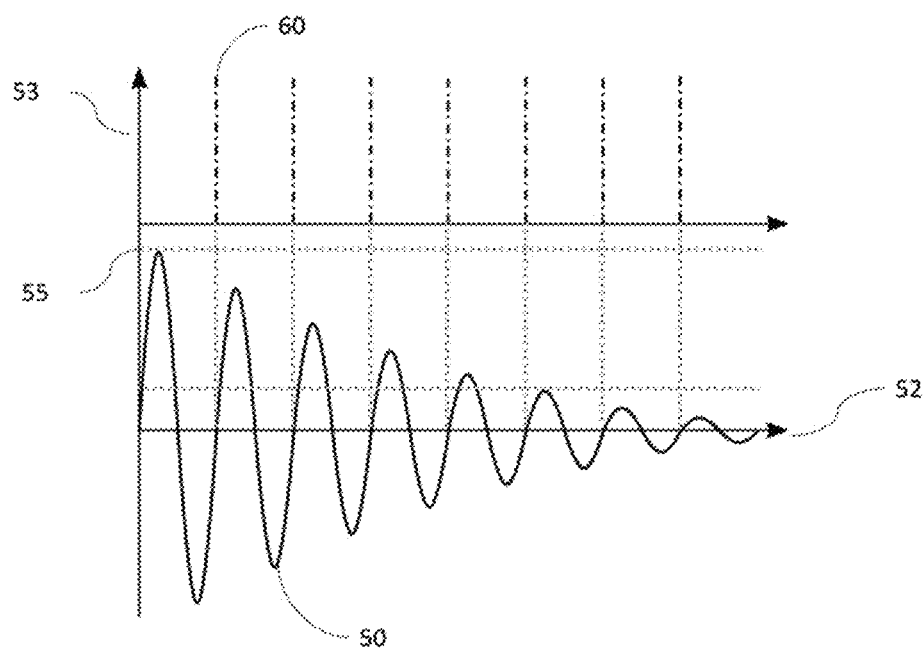
FIG. 8 is a schematic representation of torque felt during the alternating activation at each step of N magnetization states of the permanent magnet continuously decreasing as a function of the position of the actuated button.

FIG. 8 shows the modification of the notching amplitude by the circuit for controlling the supply current of the coil, at different angular positions (60) so as to obtain a progressively decreasing notching amplitude as a function of the relative angular position (52) of the two magnetic structures.

The angular positions (60) of amplitude modification are made, for example, at unstable equilibrium positions of the magnetic interaction between the two toothed structures. The signal for triggering the change of amplitude represented in the upper part of FIG. 8 is not representative of the current flowing through the coil.

To obtain a different magnetization amplitude, two methods are preferred without limiting the present disclosure. The first method consists in successively applying a demagnetization current cycle and then a magnetization current to reach the desired notching level. This method has the advantage of simplifying the control electronics, since the demagnetization cycle is independent of the initial magnetization level and the relationship between the magnetization current and the magnetization level obtained from a zero level is easily characterizable data.

The second method consists in characterizing integrally the relationship between the persistent magnetization and the magnetization current for all the pairs of initial and final magnetization levels that it is desired to obtain. This method, although more complex to implement, has the advantage of reducing the electrical consumption of the device in use, but also of limiting the variations of forces felt by the user when changing the level of magnetization.

Figure 9:
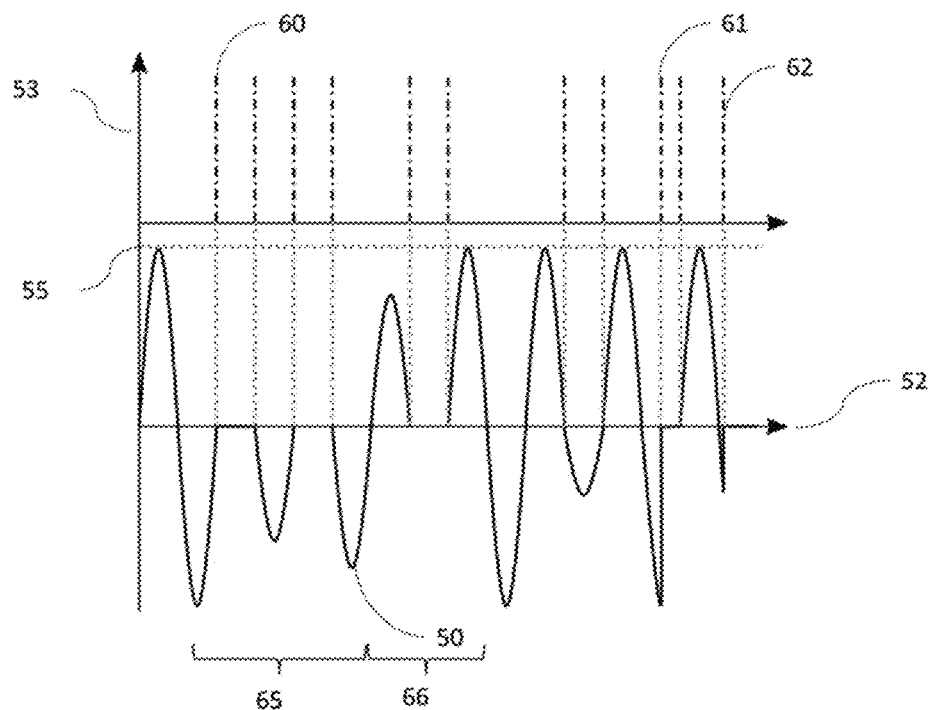
FIG. 9 is a schematic representation of torque felt during the activation of N magnetization states of the permanent magnet according to a pre-recorded profile as a function of the position of the actuated button.

FIG. 9 shows other notching modifications allowed by the device according to the present disclosure. For example, for an angular range (66), the circuit for controlling the supply current of the coil can eliminate all the negative alternations of the pair, so as to obtain, over this range, only a resistive or zero sensation for the user. The sensation over this angular range (66) corresponds to a friction modulation effect as it could be obtained with the structures presented in the prior art using a magnetorheological fluid. On the other hand, the device according to the present disclosure has a completely new haptic effect, as shown over the angular range (65), with the elimination of all the positive alternations of torque. The sensation effect felt by the user is thus the alternation of a motor torque and of a zero torque whose very different sensation makes it possible to associate alternative information therewith. The changes of magnetization states carried out outside the equilibrium positions, as shown by the transitions (61, 62), lead to a large variation in force that will be perceived by the user. Such transitions are therefore to be avoided, as soon as it is desired to obtain a state change as transparent as possible for the user. Indeed, the electric pulse generated to modify the magnetization state of the semi-persistent magnet leads to the production of a high-amplitude magnetic field, modifying the force applied to the user-mobilized structure. This variation in force is zero when the structures are in the relative angular equilibrium position. Therefore, as a criterion, the modification of the notching is preferentially generated for angular positions located less than 25% of the period of the notching of the indexing means, around an equilibrium position, if it is desired that this modification be transparent for the user. This corresponds to a good compromise between the quality of sensation by the user and the precision required on the position sensor. For the most demanding specifications, the sensation may be improved by limiting the interval to 10% of a period of the notching of the indexing means.

A Notching Device Alternative with Two Coiled Magnets

Figure 10:
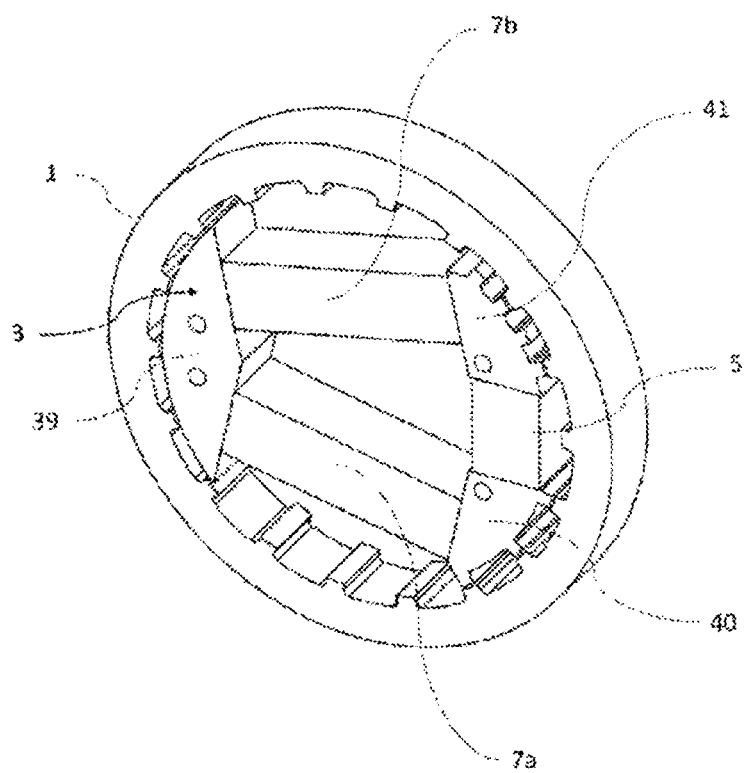
FIG. 10 shows a perspective view of an alternative embodiment of active notching device.

FIG. 10 shows a view of an alternative embodiment of the second ferromagnetic structure (3) with two semi-persistent magnets (7a, 7b), of the AlNiCo type, for example, extending from a ferromagnetic yoke (39) common to the two magnets (7a, 7b) to yokes (40, 41), respectively, the yokes (40, 41) being connected by a high persistence permanent magnet (5).

The yoke (39) has no teeth in the example described. The yokes (40, 41) have steps spaced apart with different angular intervals that correspond respectively to frequencies of 18 and 36 notches per revolution.

The magnets (7a, 7b) are each surrounded by a coil, not shown in the figure, which makes it possible to reverse the polarity and to modify the intensity of magnetization of each of the magnets (7a, 7b), the magnetization of the magnet (5) not being modified. Each of the coils is supplied by a current controlled by a control circuit receiving as input the angular position of the first external structure (1) relative to the second structure.

Figure 11:
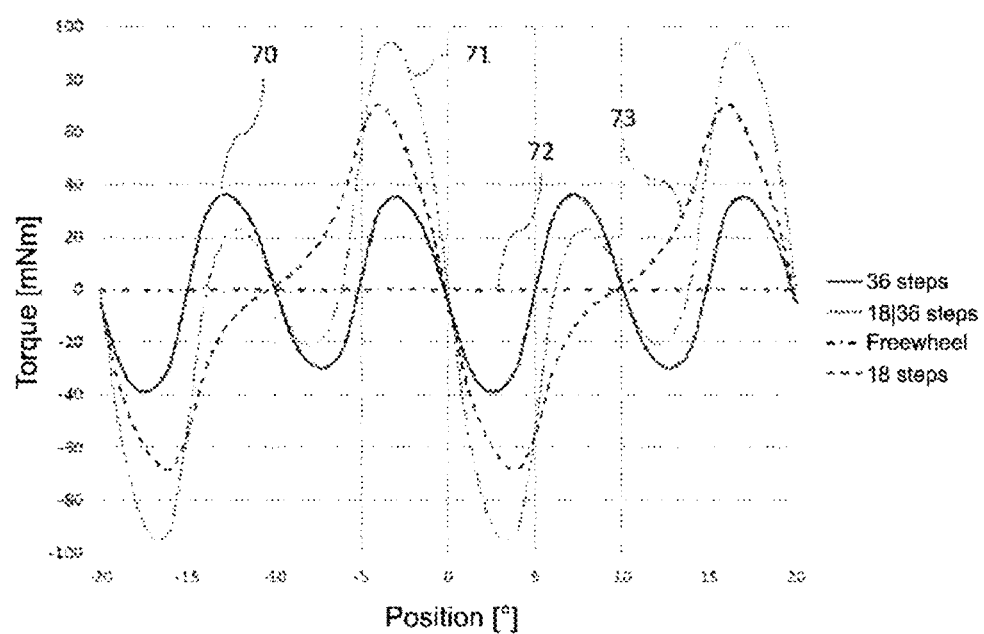
FIG. 11 shows the force curves of the alternative embodiment of FIG. 10.

FIG. 11 shows force curves during a relative movement of the first structure (1) relative to the second structure (3) for the alternative shown in FIG. 10, and this as a function of different possible polarization states of the magnets (7a) and (7b). To present these curves, two states of magnetization of each of the magnets (7a and 7b) are proposed, state 1 of which corresponds to a polarization of the magnet (7a, 7b) for which the magnetic flux generated in its respective yoke (40, 41) opposes the magnetic flux generated by the magnet (5) in this same yoke, and state 2 in which the flows are added to the yokes (40, 41). Thus, the curve (70) corresponds to the force obtained when the magnet (7a) is in state 1 and the magnet (7b) is in state 2, generating a force of 36 notches over a complete rotation. The curve (73) corresponds to the force obtained when the magnet (7a) is in state 1 and the magnet (7b) is in state 2, generating a force of 18 notches over a complete rotation. The curve (71) corresponds to the force obtained when the two magnets (7a, and 7b) are in state 1, generating a superposition of both forces described previously at 36 and 18 notches over a complete rotation. The curve (72) corresponds to the force obtained when the two magnets (7a, and 7b) are in state 2, not generating any force during the rotation.

Of course, the curves obtained are only illustrations of possible forces, with other profiles obtainable by modulating the amplitude of magnetization of the magnet (7a) relative to the magnet (7b).

Active Stop Device

The present disclosure also relates to a stop device that can be activated in any position of the relative movement.

In general, this stop device comprises:
a first structure (100) formed of a ferromagnetic material,
a second structure (200) in relative movement with respect to this first structure (100), the second structure (200) comprising at least one ferromagnetic body (210), having at least one housing (220, 221), and supporting at least one coil (250) able to modify the magnetization state of the ferromagnetic body (210), and
at least one braking element (310, 320) comprising a permanent magnet (350).

The housing (220, 221) is opposite the first structure (100) and forms with the latter a magnetic air gap (300) wherein a braking element (310, 320) is housed, the position of the braking element (310, 320) within the housing (220, 221) depending on the state of magnetization of the ferromagnetic body (210).

It is specified that the braking element (310, 320) is a solid material, excluding magnetorheological fluids, requiring complex construction with a sealed enclosure, in particular.

In an alternative embodiment,
a first magnetization state of the ferromagnetic body (210) induces a mechanical contact of one of the braking elements (310, 320) with the first structure (100), the braking element impeding the movement of the first structure (100) in a direction of movement according to one degree of freedom,
a second magnetization state of the ferromagnetic body (210) induces a mechanical contact of the braking element (320, 310) complementary to the first structure (100), the braking element impeding the movement of the first structure (100) in the opposite direction of movement according to the same degree of freedom, and
a third state of magnetization of the ferromagnetic body (210) induces an absence of mechanical contact of the braking elements (310, 320) with the first structure (100), the first structure (100) being free to move according to this same degree of freedom.

In one alternative embodiment,
a first magnetization state of the ferromagnetic body (210) induces mechanical contact of the two braking elements (310, 320) with the first structure (100), the braking elements impeding the movement of the first structure (100) in both directions of movement with a degree of freedom, and
a second magnetization state of the ferromagnetic body (210) induces an absence of mechanical contact of the braking elements (310, 320) with the first structure (100), the first structure (100) being free to move according to this same degree of freedom.

During the various alternative embodiments, the contacting of a braking element (310, 320) with the first magnetized structure (100) impedes the movement of the first structure (100), either by friction, or by a dead stop, or by elastic stop.

The magnets (350, 351) of the braking elements (310, 320) are necessarily of strong coercive field, typically 600 kA/m and in all cases greater than 100 kA/m. For its part, the persistence is not of real concern. Thus, a whole range of magnets extending from ferrites to the sintered neodymium magnets may be suitable and will be chosen as a function of the mechanical strength required by the magnets.

The first structure (100) is made of a ferromagnetic material so as to improve the circulation of the flow at the braking element (310, 320) and to improve the contacting thereof with the first structure (100). However, this first structure (100) could be made of a non-magnetic material, for example, to reduce its weight, when the desired braking performance is less.

First Example of Active Stop

According to a first embodiment, monostable device in the free position is proposed.

Figure 12A:
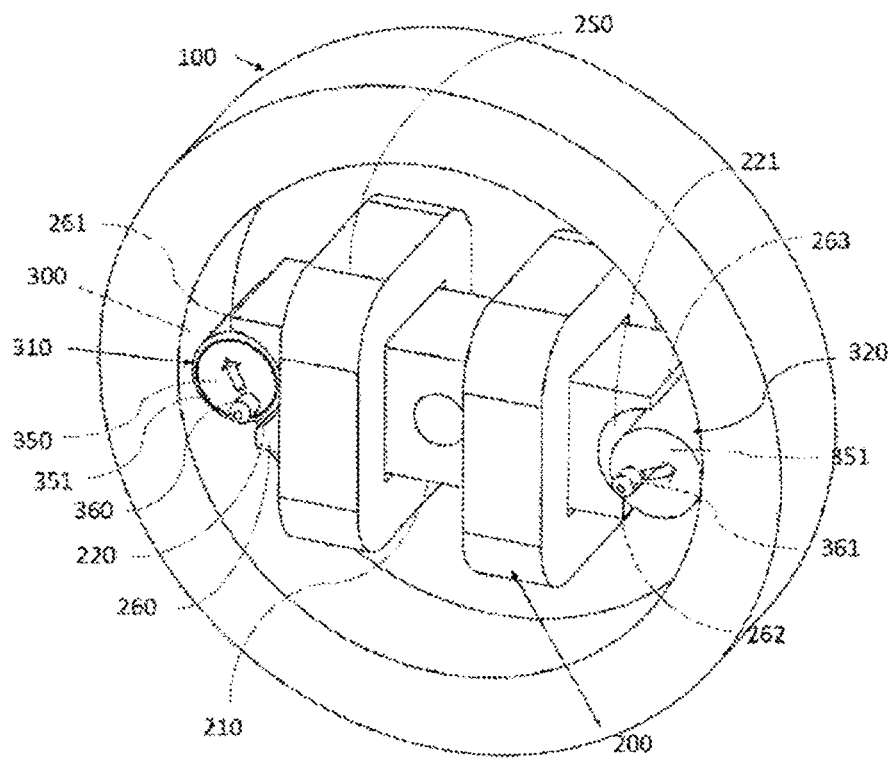
FIG. 12A shows a perspective view of a first embodiment of an active stop device with rotary movement and with rotary guide braking elements.

In this embodiment, shown in FIG. 12A in a rotary version, the ferromagnetic body (210) is made of a soft ferromagnetic material the magnetization of which is zero in the absence of supply current to the coil (250). The housings (220, 221) have an asymmetrical partially cylindrical shape and are each able to receive a cylindrical braking element (310, 320).

The braking elements (310, 320) comprise a cylindrical magnet (350, 351) with an eccentric axial pivot (360, 361) passing through, fixed relative to the second structure (200), and allowing only one degree of freedom in rotation of the magnet (350, 351) around the latter. The eccentric rotation in one direction allows the braking element (310, 320) to come into contact with the first structure (100), or in the opposite direction allows the braking element (310, 320) to be inserted within its housing (220, 221).

When the braking element (310, 320) is in contact with the first structure (100), the movement of the first structure (100) in one direction may lead to its blocking by abutment of the braking element (310, 320) due to the eccentric rotation. The movement of the first structure (100) according to the opposite direction of movement allows the release of the blocking by abutment, if necessary, and the remainder of the movement is only braked by the braking element (310, 320).

The position of the braking element (310, 320) within the housing (220, 221) depends both on the magnetic field generated by the magnet (350, 351) of the braking element (310, 320), but also on the magnetic state of the ferromagnetic body (210). In the example of FIG. 12A, the ferromagnetic body (210) has three notable magnetization states as a function of the current flowing through the coil (250),
- either the coil has no current passing through it and the magnetization state is zero,
- or the coil has a positive current passing through it that is greater than a threshold current, which leads to the magnetization state called "positive magnetization," and
- or the coil has a current passing through it of the same intensity but flowing in the opposite direction, which leads to the "negative magnetization" state.

The housing (220, 221) of the ferromagnetic body (210) is delimited by asymmetrical pole tips (260, 261, 262, 263) that are asymmetrical in the example described, carefully sized and leading to a particular position of the braking element as a function of the state of magnetization of the ferromagnetic body (210).

When the ferromagnetic body (210) is in the zero magnetization state, a force is exerted on the braking element (310, 320) attracting it into the housing, and generated by the looping of the magnetic field, generated by the magnet (350, 351) of the braking element (310, 320), in the ferromagnetic body (210) through pole tips (260, 261, 262, 263). When the ferromagnetic body (210) is in a positive or negative magnetization state, the magnetic field that it generates is looped back from one housing (220, 221) to the other, it then exerts a force on the braking element (310, 320) to align its magnetic field with that of the ferromagnetic body (210).

Along the magnetization direction of the magnet (350, 351) or the position of the eccentric axial pivot (360, 361), the braking element will be in contact with the first structure (100) for a positive magnetization state of the ferromagnetic body (210) and attracted within its housing (220, 221) in the case of negative magnetization, or vice versa.

Thus, if the two magnets (350 and 351) have an opposite behavior when the magnetization state of the ferromagnetic body (210) is not zero, as shown in FIG. 12A, in the case of positive magnetization, a blocking of the movement in a first direction is obtained by one of the braking elements (310, 320) and free movement in the opposite direction, and in the case of negative magnetization, a free movement is obtained without the first direction and a blocking by the second braking element (320, 310) in the opposite direction.

Figure 12B:
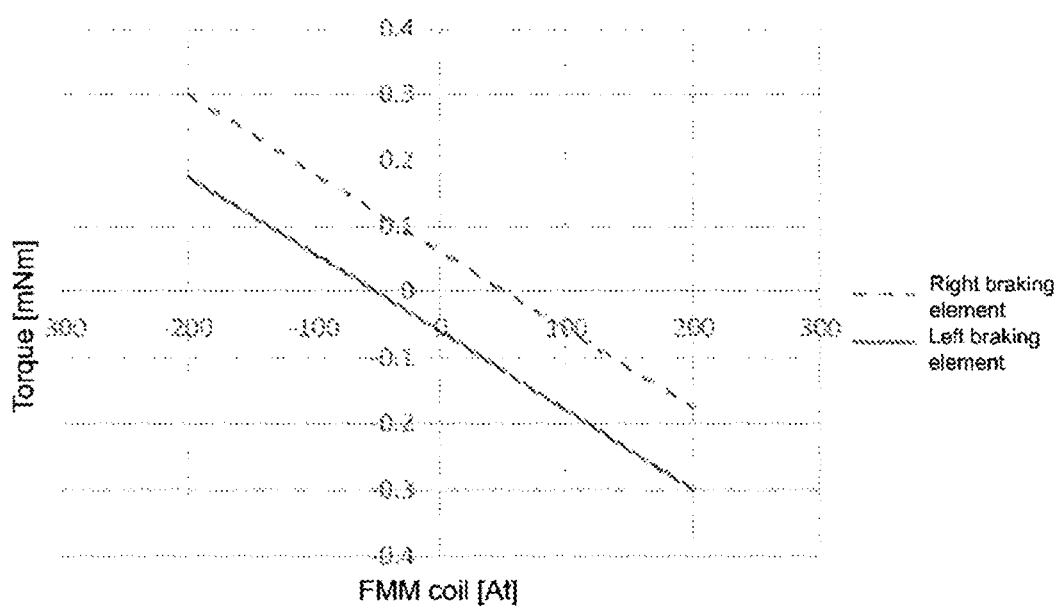
FIG. 12B shows the torque generated on the braking elements of the stop device shown in FIG. 12A.

FIG. 12B shows the torque obtained on the two braking elements (310, 320) around their pivot point as a function of the supply current to the coil (250), when the braking elements (310, 320) each allow blocking in an opposite direction, as described in the preceding paragraph. It may be noted that, at zero power supply current, the two friction parts (310, 320) have an opposite torque, which allows each of them to be inserted into its housing (220, 221) and to obtain free rotation of the first structure (100) relative to the second structure (200).

However, this is not limiting of the present disclosure and if the two magnets (350 and 351) have identical behavior as a function of the magnetization state of the ferromagnetic body (210), a blocking in both directions is obtained for a given magnetization and a free movement for the opposite magnetization.

In the preferred embodiment, the first structure (100) has a part made of a soft ferromagnetic material to promote the looping of the flux generated by the ferromagnetic body (210) and therefore to maximize the force exerted on the braking elements (310, 320), although this is not limiting on the present disclosure.

Finally, this embodiment has a braking element (310) integrating a magnet (350) integrated into a ferrule (351); this ferrule (351) is optional and may have several functions, such as improving the friction coefficient, or improving the mechanical strength. Likewise, the rotational guiding of the friction element (310), which here is directly supported by the magnet (350), could be achieved by another integral part of the friction element (310) having other mechanical properties.

Variation of the Ferromagnetic Body (210)

Figure 13A:
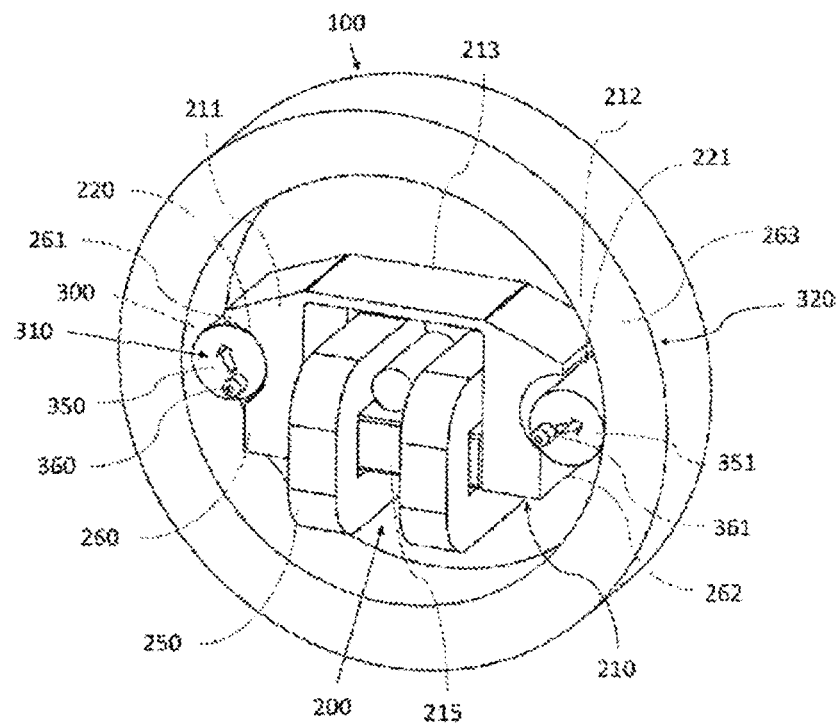
FIG. 13A shows an alternative embodiment of an active stop device having multiple stable positions without current.

An alternative embodiment of the ferromagnetic body is shown in FIG. 13A. This alternative embodiment differs from the preceding embodiment in that the ferromagnetic body (230) is not a monolithic body but an assembly of several ferromagnetic elements and in that the stop device has stable stop states, that is to say in the absence of power supply current to the coil (250). In this embodiment, the ferromagnetic body (210) has a permanent magnet (215) surrounded by the coil (250) and embedded between two flux conductors (211, 212) of soft ferromagnetic material each having a housing (220, 221).

The ferromagnetic body optionally integrates a magnetically saturable isthmus (213) directly connecting the two flux conductors (211, 212).

The permanent magnet (215) has a low coercive field, that is to say a material of the semi-persistent type or an AlNiCo-type magnet with a persistence typically of 1.2 Tesla and a typical coercive field of 50 kA/m, and in any case less than 100 kA/m. The magnetization direction is along the largest dimension of the permanent magnet (215). The low coercive field of the permanent magnet (215) is necessary in order to easily modulate the amplitude and direction of its magnetization by means of a coil located around it, and this takes place with limited energy, which makes its use in an integrated device possible without the use of powerful and expensive electronics. To modulate the direction and/or amplitude of the polarity of the magnetization of the low-coercive-field magnet, a current is applied to the coil (250) in the form of a direct current or an electrical pulse, for example, given by discharging a capacitor.

Depending on the amplitude and direction of magnetization of the permanent magnet (215), the positive and negative magnetization states of the ferromagnetic body (210) described for the preceding embodiment can be obtained, in a stable way, that is, with no current in the coil (250).

The isthmus (213) has a small cross-section so as to allow direct looping of a part of the flux of the permanent magnet (215). Direct looping is understood to mean a loop between the two poles of the magnet made integrally within a soft ferromagnetic part, a magnetic flux channeling. Since the cross-section of this isthmus (213) is intentionally limited to allow the magnetic flux of the permanent magnet (215) to be looped back only up to a given magnetization level, this level is lower than the saturation level of the permanent magnet (215), for example, 10 times lower. As long as the isthmus is not magnetically saturated, the ferromagnetic body (210) has a zero magnetization state, which makes it possible to extend the magnetization range of the permanent magnet (215) for which the ferromagnetic body (210) will be in this state, in order to advantageously to overcome the difficulty of obtaining perfect demagnetization of the permanent magnet (215).

Figure 13B:
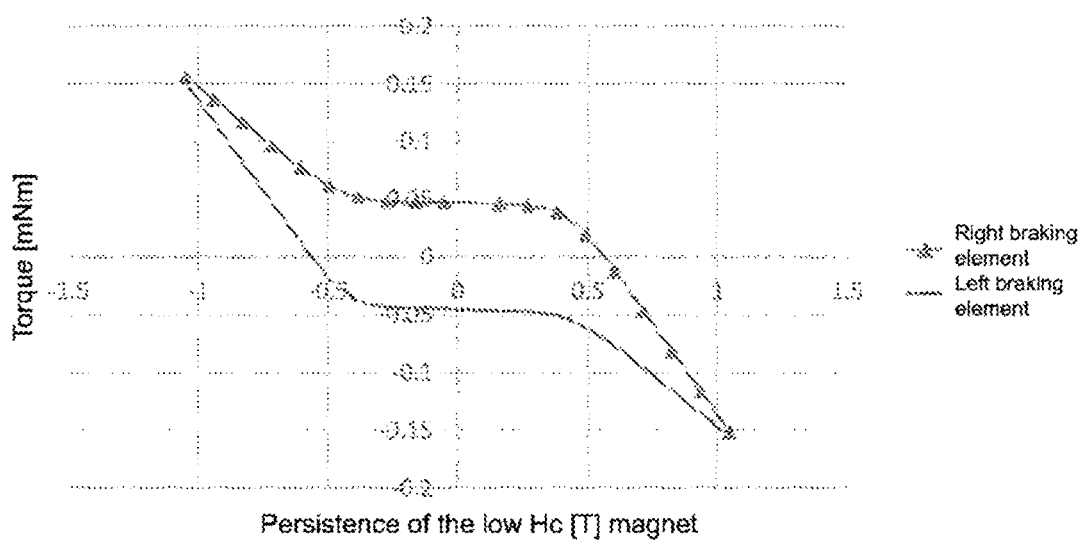
FIG. 13B shows the torque generated on the braking elements of the stop device shown in FIG. 13A.

FIG. 13B shows the torque obtained on the two braking elements (310, 320) as a function of the level of magnetization of the permanent magnet (215) when the braking elements (310, 320) each allow blocking in one direction, as described in the preceding paragraph. The effect of the magnetic isthmus is shown by the presence of a torque plateau up to a certain amplitude of magnetization of the permanent magnet (215). It can be noted that at low magnetization level, the two friction parts (310, 320) have an opposite torque, which allows each of them to be inserted into its housing (220, 221) and to obtain free rotation of the first structure (100) relative to the second structure (200).

An Alternative of the Braking Element (310, 320)

Figure 14:
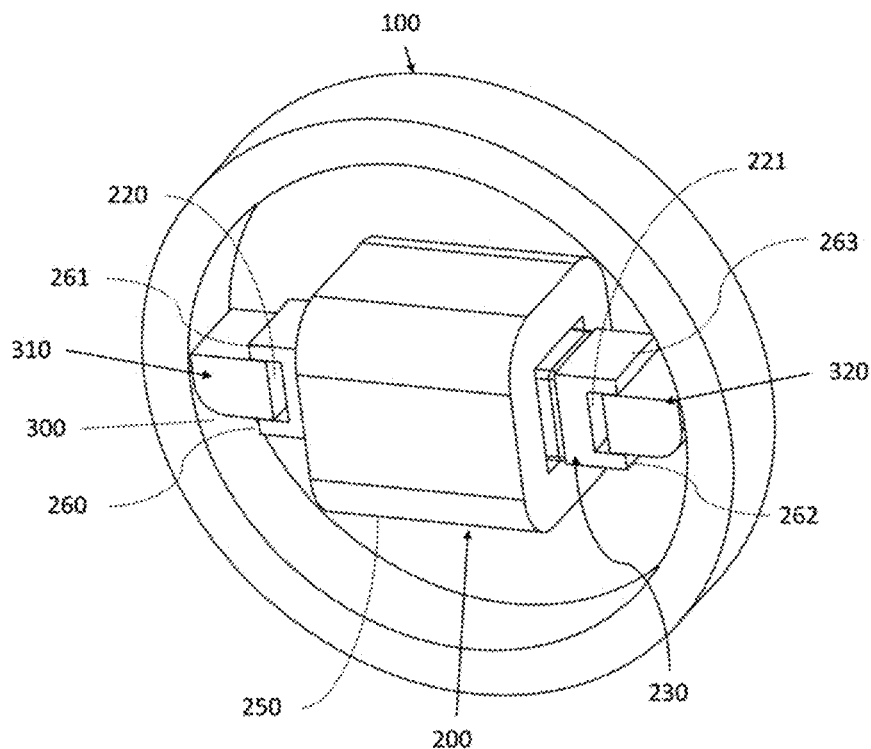
FIG. 14 shows an alternative embodiment of an active stop device having a rotary relative movement and linear guide braking elements.

An alternative embodiment of the braking element is shown in FIG. 14. In this embodiment, the housings (220, 221) of the ferromagnetic body (210) have a notch shape and the pole tips (260, 261, 262, 263) are symmetrical. The braking elements (310, 320) then have a shape complementary to the housings (220, 221) in their proximal part to engage more or less deeply with clearance, together producing a sliding connection. In their proximal part, the braking elements (310, 320) have an asymmetrical curved shape so as to cause an abutment of each of the braking elements (310, 320) in only one direction upon contacting the braking element (310, 320) with the first structure (100).

An Alternative Stop Device for a Braking Element (310)

Figure 15:
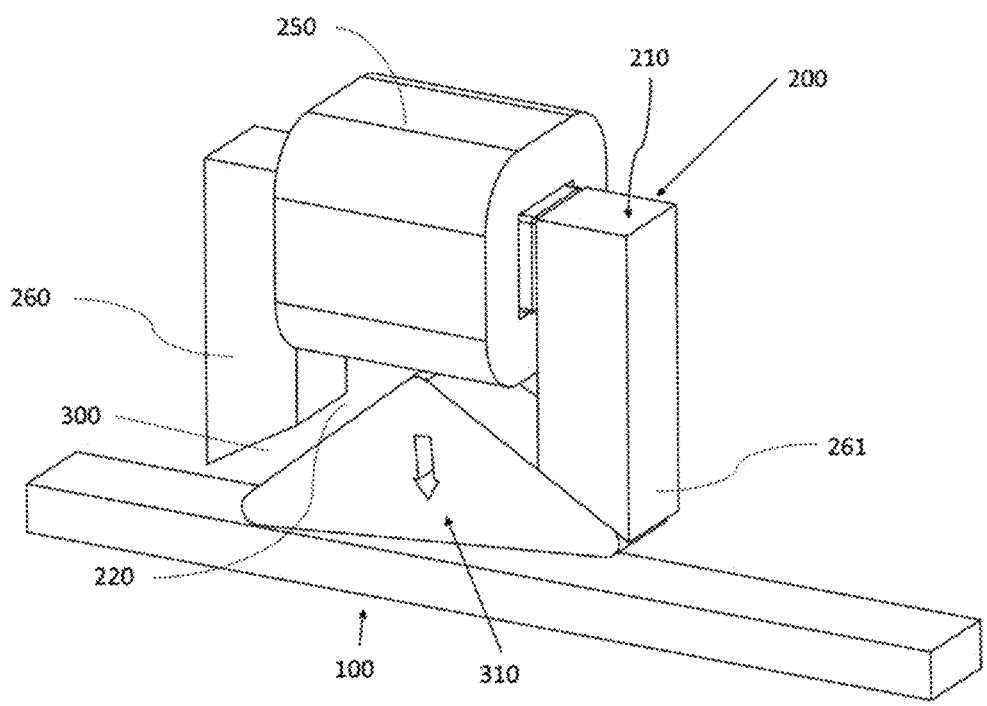
FIG. 15 shows an alternative embodiment of an active stop device having a linear relative movement and a single braking element.

An alternative embodiment of a stop is shown in FIG. 15. This embodiment differs from the preceding embodiments in that it has a linear relative displacement between the first structure (100) and the second structure (200) and in that it comprises only one braking element (310) located within a housing (220) delimited by two pole tips (260, 261) extending the ferromagnetic body (210) on either side of the coil (250). Depending on the magnetization state of the ferromagnetic body (210), the braking element (310) is:

either attracted by a polar tip (260, 261) and pushed by the second pole tip (261, 260), in the case of positive magnetization, this producing a stop in a relative movement direction between the first structure (100) and the second abutment structure (200) of the friction piece (310) and a rotation with friction in the opposite direction, or attracted by the first polar tip (260, 261) and pushed back by the second, in the case of negative magnetization, this producing a stop in the opposite relative movement direction of the first and second structures, and or attracted by both pole tips (260, 261), in the case of zero magnetization, this leaving the relative displacement between the first and second structures in both directions.

Of course, this stop version is not limited to a linear movement and could be adapted by the person skilled in the art for use in a rotary device.

Alternative Embodiment of an Indexing Stop

Figure 16A:
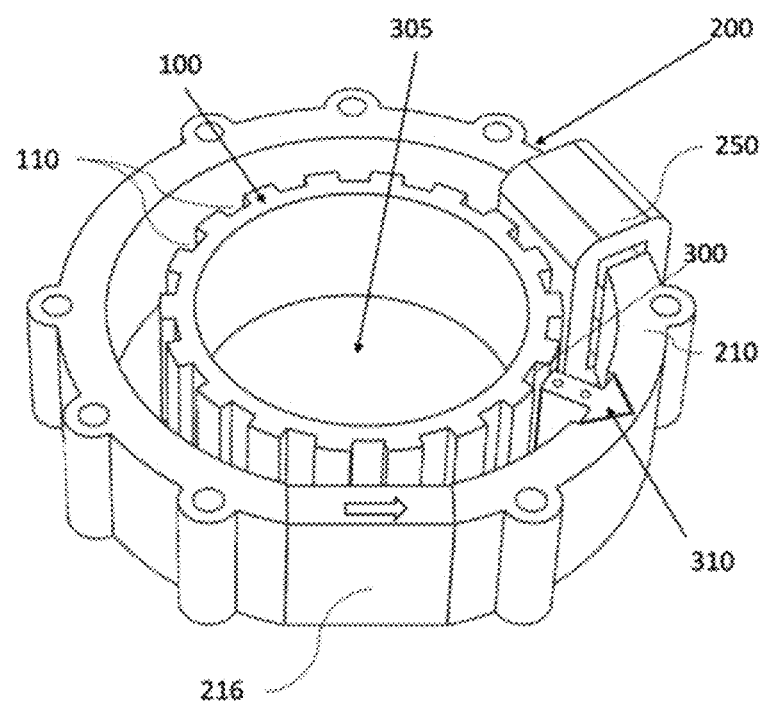
FIGS. 16A and 16B show an alternative embodiment of an active stop device having an indexing stop for two different states, free and blocked.
Figure 16B:
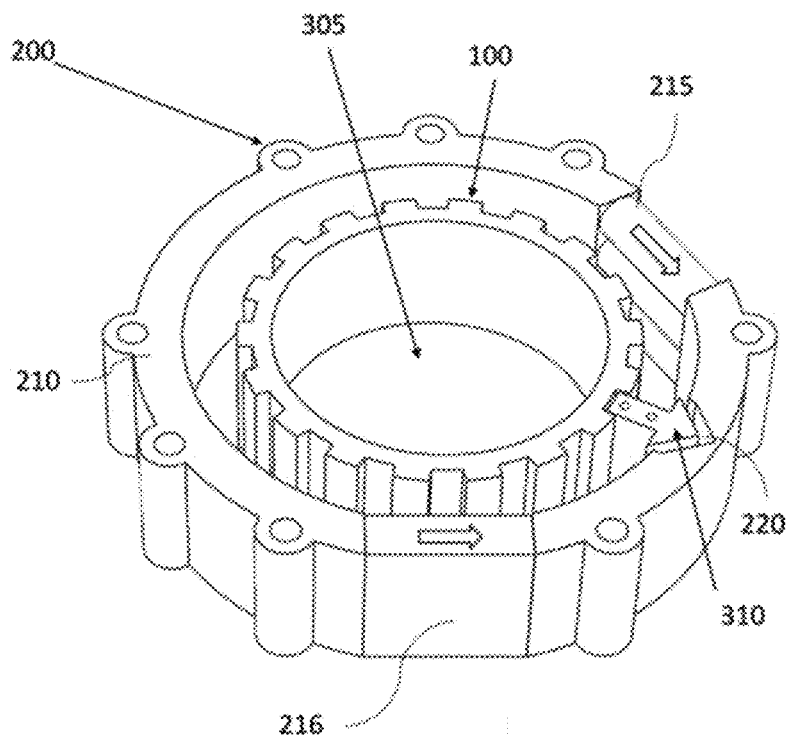
Figure 17:
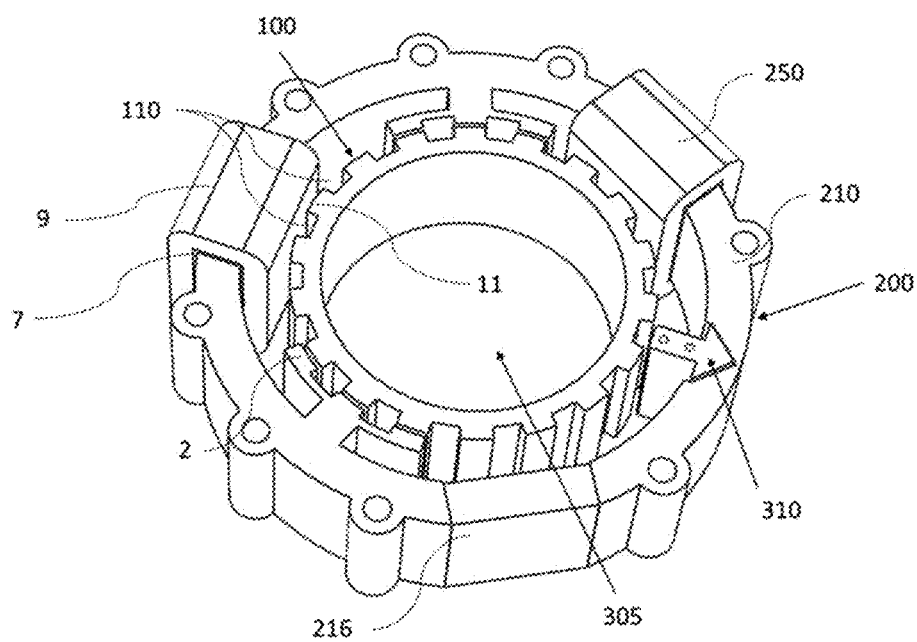
FIG. 17 shows the integration of the preceding stop device into a notching system according to the present disclosure.

An alternative embodiment of a stop is shown in FIGS. 16A, 16B, and 17. This embodiment differs from the embodiments shown in FIG. 13A in that the first structure (100) is located inside the second structure and has notches (110) spaced periodically, these notches being able to accommodate the braking element (310).

These embodiments have the particularity of a central through-recess (305), making it possible to produce a button surrounding a cylindrical enclosure or equipment having a cylindrical body, with a rotating ring, for example, a timepiece.

They also make it possible to arrange in the central recess (305) or behind the central recess (305) a display screen for displaying an indication representative of the state of the button or of the function controlled by the button.

The stop is no longer produced by abutment but by fitting the braking element (310) into one of the notches (110). This embodiment also differs from the preceding embodiments in that it does not make it possible to obtain a stop in any relative position of the first structure (100) relative to the second structure (200) but in indexed positions corresponding to the periodicity of the notches (110). This embodiment also differs in that the braking element (310) systematically carries out a stop in both relative movement directions of the first and second structures. Finally, this embodiment differs from the preceding embodiments in that the different magnetic states of the ferromagnetic body (210) are obtained by cooperation of two magnets (215, 216) and a coil (250) at least partially surrounding the magnet (215). The magnet (215) has a low coercive field, less than 100 kA/m, so as to be able to easily modulate its amplitude and its magnetization direction by electrically supplying the coil (250). The second magnet (216) has a strong coercive field, greater than 100 kA/m, so its magnetization is not modified when the coil (250) is supplied with electricity.

FIG. 16A shows this stop device in the magnetic state of the ferromagnetic body (210) allowing the free relative rotation of both structures (100, 200), and FIG. 16B has the stop device in the magnetic state of the ferromagnetic body (210) making it possible to engage the braking element (310) in a notch (110) of the first structure.

Finally, even if this device has an indexing of the stop positions, the magnetic state of the ferromagnetic body (210) can be modified in any relative position of the first and second structures (100, 200), leading to the friction of the braking element (310) on the outer periphery of the first structure (100) until it engages in a notch (110).

FIG. 17 shows the integration of this stop alternative in an indexing device according to the present disclosure. The first structure (100) then has teeth (2) cooperating with the teeth (11) delimiting the periodic notches (110) of the second structure (200). This second structure then has a third magnet (7) of low coercive field, partially surrounded by a second coil (8), the state of magnetization of the second structure being able to be modified by the supply of one or the other of the coils (8, 250) so as to generate:

a periodically variable mode of force during the relative movement of the two structures (100, 200), a free rotational mode during the relative movement of the two structures, and a stop mode where the two structures can no longer move relative to one another.

Exemplary Application

Figure 18:
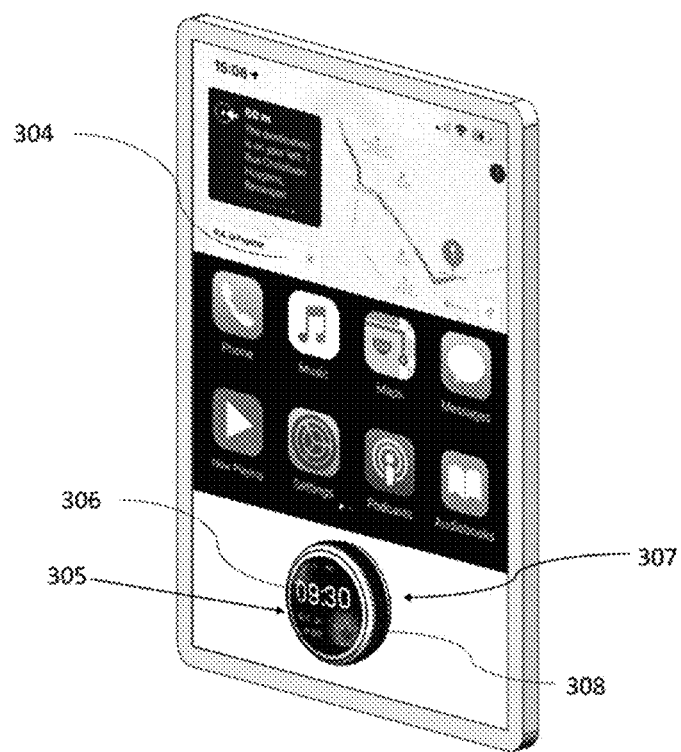
FIG. 18 shows the integration of the control device according to the present disclosure with a display screen.

The haptic control device according to the present disclosure is, in particular, intended to supplement a display screen (304), an example of which is shown in FIG. 18. The toothed structure (11) is associated with a screen (304), and the structure (100) is driven by a peripheral ring (308). The recessed central portion (305) of the control device (307) allows a screen (306) to be housed therein in order to display information at the center of the device, for example, the volume level of the sound. In an alternative version, the toothed structure is directly bonded to the surface of a screen (304) and the screen (306) is a part of the screen (304) visible through the recessed central part (305) of the control device.

This application makes it possible to produce dynamic man-machine interfaces (MMI) associating the flexibility of a display screen, in particular, a touch screen, with the precision of a mechanical button, with a permanent functional interaction between the display and the various control modes, tactile via the screen or haptic via the control device.

This solution is particularly suitable for a centralized MMI of a motor vehicle, for example, an electric vehicle, controlling a large number of functionalities relating to vehicle operation, comfort, and infotainment functions. Certain functions, in particular, techniques, are critical, for example, the driving mode (sport, economy, etc.) and simply sliding a finger on a touch screen does not give a satisfactory sensation. The haptic feedback of the device according to the present disclosure is then more appropriate.

For other functions, such as temperature adjustment, it is desirable to be able to quickly reach a fine adjustment area, and in this case the flexibility of the indexing allowed by the present disclosure dynamically makes it possible to adjust the rotation pitch.

A similar application relates to household appliances, for example, a glass-ceramic or induction cooking plate, where controlling the indexing of a control button arranged on the plate, advantageously with visibility through a central recess of a textual or graphic information, makes it possible to expand the controls of the plate.

Another application relates to the control of audiovisual equipment, making it possible to use the same button, with controlled indexing, for controlling the sound level, the selection of a channel or a station.

Another feature relates to recording the most frequent positions, for each of the modes of use, in order to control an operating mode corresponding to the personalized habits of the user. To this end, a computer periodically records the state of the control device and, in particular, the state of supply of the coil (250) and the position of the control button to determine frequent combinations.

Alternative Embodiment

According to one alternative embodiment, the electrical signal delivered by the position sensor (10) is derived to provide a signal representative of the speed of movement of the control member. The signal thus processed makes it possible to modulate the force dynamically as a function of the operating dynamics of the member, for example, to reduce the pitch of the notches and to increase their effect during low-speed movements, in order to improve the accuracy of the movements, and on the contrary to increase the pitch of the notches and reduce their amplitude during movements at higher speed.

The invention claimed is:
1. A control device, comprising:
   at least one permanent magnet;
   a mechanically-guided member to allow relative movement between:
      a. a first ferromagnetic structure, and
      b. a second ferromagnetic structure comprising at least one electric coil, the electric coil modifying the magnetization state of the second ferromagnetic structure along the direction and amplitude of the electric current flowing in the coil;
   a position detection means for detecting the relative position of the first and second ferromagnetic, structures; and
   a control circuit for controlling the supply of current to the coil varying as a function of the signal delivered by the position detection means.

2. The control device of claim 1, wherein the control circuit controls the supply current of the coil as a function of a signal representative of the relative position of the first and second ferromagnetic structures.

3. The control device of claim 1, wherein the control circuit controls the supply current of the coil as a function of a signal representative of the speed of relative movement of the first and second ferromagnetic structures.

4. The control device of claim 1, further comprising magnetic indexing means for magnetic indexing of the movement by the magnetic interaction between the first and second ferromagnetic structures, the at least one permanent magnet being integral with the second ferromagnetic structure, and wherein the permanent magnet is at least partially surrounded by at least one coil controlling a state of magnetization of the second ferromagnetic structure through the modification of the magnetization of the permanent magnet in the direction and amplitude of the electrical current flowing in the at least one coil, the magnetic indexing means being modulated by the state of magnetization of the second ferromagnetic structure.

5. The control device of claim 2, wherein the first and second ferromagnetic structures, respectively, have a plurality of radial teeth cooperating to produce the magnetic indexing means.

6. The control device of claim 1, further comprising a means for selecting a variable force mode from a plurality of predetermined variable force modes, configured to deliver a signal used by the control circuit to modify the supply mode of the coil.

7. The control device of claim 1, further comprising an interface with controlled equipment delivering a signal used by the control circuit to modify the supply mode of the coil.

8. The control device according to claim 1, further comprising a position sensor configured to measure the position of the first ferromagnetic structure to provide the control circuit with the supply current of the coil, the input signal representative of the relative position of the first and second ferromagnetic structures.

9. The control device of claim 1, wherein the first structure and the second structure have teeth, and wherein the second ferromagnetic structure comprises two toothed semitubular parts connected by the second magnet and by the first magnet.

10. The control device of claim 9, wherein the directions of the magnetizations of the two magnets are identical.

11. The control device of claim 4, wherein the magnetization state of the second ferromagnetic structure is modified in a relative position of the first and second structures located in an interval of more or less 25% of a period of the indexing of the indexing means, the interval being centered on a stable equilibrium position of the indexing means.

12. The control device of claim 4, wherein the magnetization state of the second ferromagnetic structure is modified in a relative position of the first and second structures located in an interval of plus or minus 10% of a period of the indexing of the indexing means, the interval being centered on a stable equilibrium position of the indexing means.

13. The control device or claim 1, further comprising an active stop comprising the first structure in relative movement with respect to the second structure, and at least one braking element to impede the relative movement between the first and second structures by the magnetic interaction between:
   a. the braking element, and
   b. the second structure comprising a ferromagnetic body at least partially surrounded with an electric coil, the electrical supply of the coil modifying the magnetization of the ferromagnetic body,
   and wherein the magnetization state of the ferromagnetic body modulates the braking force between the first and second structures.

14. The control device of claim 13, wherein the braking element is configured to modulate the braking force between the first and second structures in a single direction of the relative movement.

15. The control device of claim 13, wherein the braking element is configured to modulate the braking force between the first and second structures in both directions of the movement.

16. The control device of claim 13, wherein the ferromagnetic body comprises a soft ferromagnetic material, the magnetization of which is zero in the absence of supply current of the coil and wherein the ferromagnetic body has housings of partially cylindrical shape and each capable of receiving a cylindrical braking element.

17. The control device of claim 16, wherein the braking elements are articulated relative to an eccentric axis and, by moving one of the braking elements in one direction, the braking element comes into contact with the first structure, or in the opposite direction, the braking element retracts within its housing.

18. The control device of claim 17, wherein, when the braking element is in contact with the first structure, the movement of the first structure in one direction causes blocking of the first structure by abutment of the braking element by virtue of its eccentric rotation.

19. The control device of claim 13, wherein the braking element is configured to impede the relative movement between the first and second structures by the magnetic interaction between:
   a. the braking element,
   b. the first structure, and
   c. the second structure.

20. The control device of claim 13, further comprising indexing means for magnetic indexing of the movement between the first and second ferromagnetic structures, the indexing means being directly integrated into the first and second structures, or being made using two additional ferromagnetic structures, one of the additional ferromagnetic structures being integral with the first or second ferromagnetic structure, the other additional ferromagnetic structure being integral with the other of the first and second ferromagnetic structures.

21. The control device according to claim 13, wherein the ferromagnetic body has a permanent magnet at least partially surrounded by the coil, the amplitude of magnetization of the permanent magnet being modulated by the coil.

22. The control device of claim 1, wherein the control of the coil is controlled by a computer associated with a memory periodically recording the states of the control device in order to determine the most frequent states.

23. A man-machine interface comprising a display screen and at least one control device according to claim 1 arranged on a viewing surface of the display screen.

24. The man-machine interface according to claim 23, wherein the control device has a central recess for displaying, in the screen zone arranged behind the central recess, information determined as a function of the state of the control device.

25. An actuator comprising a module for driving an output member and a control device according to claim 1 coupled to the output member.

* * * * *